United States Patent [19]

Hughes

[11] 3,803,506

[45] Apr. 9, 1974

[54] CONTROL CONVERTER AMPLIFIERS

[75] Inventor: Richard Smith Hughes, China Lake, Calif.

[73] Assignee: The United States of America as represented by the Secretary of the Navy, Washington, D.C.

[22] Filed: Feb. 1, 1971

[21] Appl. No.: 111,722

[52] U.S. Cl. ............... 330/30 R, 318/561, 318/619, 330/85

[51] Int. Cl. ............................................ N03f 3/68

[58] Field of Search ........... 318/561, 564, 619, 628, 318/677, 678, 681; 330/26, 30, 69, 85, 124 R

[56] References Cited

UNITED STATES PATENTS

| | | | |
|---|---|---|---|
| 3,997,668 | 8/1961 | Nolle | 330/124 R |
| 3,430,156 | 2/1969 | Katzin | 330/124 R |

*Primary Examiner*—Maynard R. Wilbur
*Assistant Examiner*—N. Moskowitz
*Attorney, Agent, or Firm*—R. S. Sciascia; Roy Miller; R. W. Adams

[57] ABSTRACT

Matched video variable gain amplifiers having dynamic resistances coupled to the input and output circuits thereof and having reciprocal logarithmic responses so that the output of a video servo loop can be nulled.

2 Claims, 3 Drawing Figures

INVENTOR.
RICHARD SMITH HUGHES
BY: ROY MILLER
ATTORNEY.

CONTROL CONVERTER AMPLIFIERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention comprises an improvement in a servo loop comprising the incorporation of variable gain amplifiers wherein the dynamic resistance in the input and output circuits of the amplifiers is controlled. The servo loop is a null seeking loop and the gain of the variable gain amplifiers is controlled in such a manner that the gain of one with respect to the other is inverse.

DESCRIPTION OF THE PREFERRED EMBODIMENT

Figure 1:
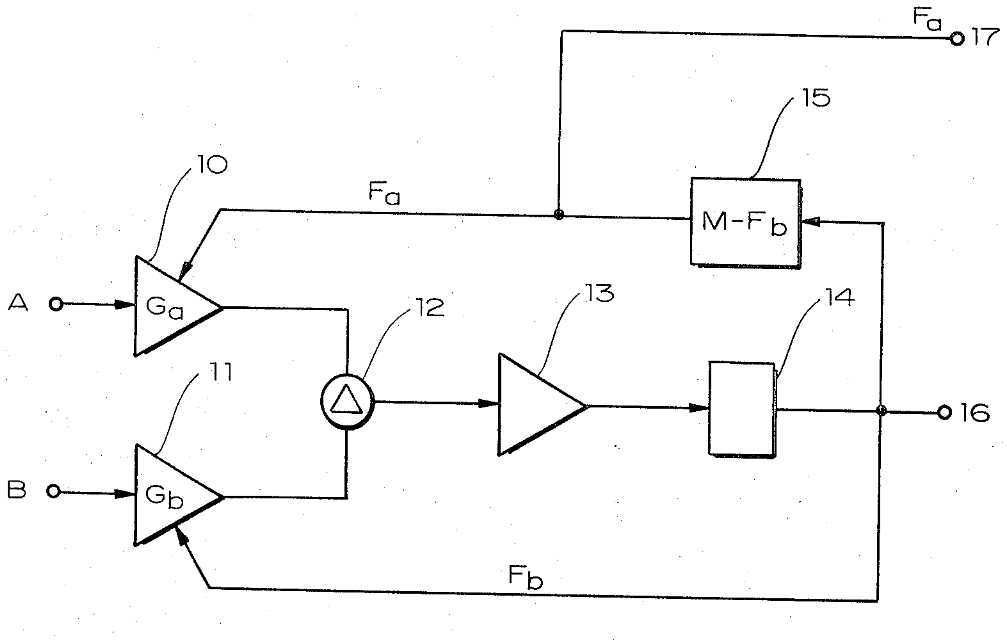
FIG. 1 is a block diagram of the basic control converter and tracking loop.

With respect to FIG. 1, input signals A and B are coupled into control converters 10 and 11, respectively. The control converters are gain-controlled with a logarithmic gain response. The respective instantaneous gains are $G_a$ and $G_b$ respectively. The outputs of the control converters are subtracted in differencing amplifier 12 and the difference is amplified by an automatic gain controlled (AGC) difference video amplifier 13.

The output of the video amplifier 13 is coupled to an integrator 14 which produces an output D.C. voltage. One output of the integrator 14 is coupled directly back to control converter 11 while the same output is coupled back as an input to control converter 10 through a D.C. inverter 15.

Outputs are taken from the integrator 14 and the D.C. inverter 15 at outputs 16 and 17, corresponding to $F_b$ and $F_a$ respectively, for use in other circuitry.

In operation, the output ($F_b$) of the pulse integrator 14 is coupled back to control the variable gain amplifier 11. $F_b$ is subtracted from a voltage reference, M, to form the $F_a$ feedback signal which controls the gain of the control converter amplifier 10. The operation is such that the gain of one control converter will be increased while the other is decreased to drive the difference of their outputs to zero. For example, if input signal A is greater than input signal B, the output of the differencing amplifier 12 will be a positive pulse. The integrator output voltage will increase, thus increasing the gain, $G_b$, of amplifier 11. At the same time $F_a$ decreases, ($F_b$ increases, therefore $M - F_b$ decreases) thus decreasing the gain, $G_a$, of amplifier 10. This action continues until $G_a \times A$ equals $G_b \times B$. It is important that the gain of the control converters be a logarithmic function of $F_a$ and $F_b$ and temperature stable. Also, it is important that if $G_a$ increases X db, $G_b$ decrease by X db.

Figure 2:
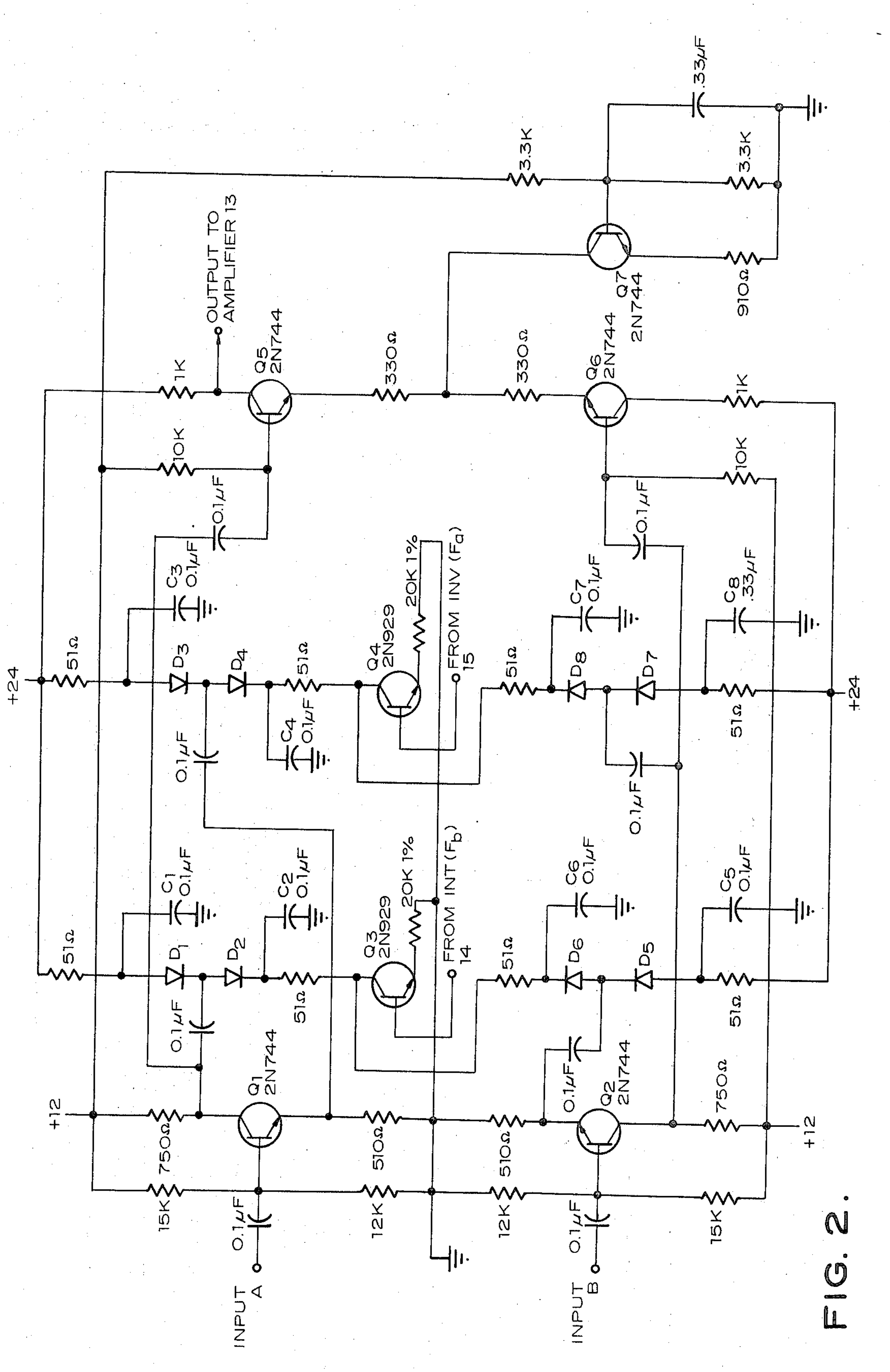
FIG. 2 is a detailed schematic of the control converters.

The schematic of FIG. 2 illustrates the circuitry associated with the control converter function. Transistors $Q_1$ and $Q_2$ are the variable gain amplifiers 10 and 11 associated with the input signals A and B, respectively. Diodes $D_1$ through $D_8$ are the variable gain elements associated with the transistors $Q_1$ and $Q_2$. Transistors $Q_3$ and $Q_4$ are constant current drive sources for the variable gain diodes $D_1$ through $D_8$. Transistors $Q_5$, $Q_6$ and $Q_7$ comprise the difference amplifier 12 of FIG. 1.

The circuit of FIG. 2 operates as follows. The gain of the amplifiers $Q_1$ and $Q_2$ ($G_a$ and $G_b$ respectively) depends on the dynamic resistance offered by the diodes $D_1$ through $D_8$. When the integrator voltage ($F_b$) is equal to the inverter voltage ($F_a$), the currents through $Q_3$ and $Q_4$ are equal and all diodes have the same dynamic resistance. Thus, the gain, $G_a$, of $Q_1$ is equal to the gain, $G_b$, of $Q_2$ at that time.

If the integrator voltage is increased, the inverter voltage is decreased by the same amount. Thus, more current is passed through $Q_3$ and less current is passed by $Q_4$. The dynamic resistances of diodes $D_1$, $D_2$, $D_5$ and $D_6$ associated with $Q_1$ are decreased, while the dynamic resistances of diodes $D_3$, $D_4$, $D_7$ and $D_8$ associated with transistor $Q_2$ are increased.

The gain of amplifiers $Q_1$ and $Q_2$ is dependent on the dynamic resistance of the diodes associated therewith. That is, the gain, $G_a$, of $Q_1$ is dependent on diodes $D_1$, $D_2$, $D_3$ and $D_4$. Diodes $D_1$ and $D_2$ shunt the collector of transistor $Q_1$ and diodes $D_3$ and $D_4$ shunt the emitter thereof. Therefore, if the dynamic resistances of $D_1$ and $D_2$ increase, the gain $G_a$ increases and correspondingly, if the dynamic resistance of diode $D_1$ and $D_2$ decreases the gain, $G_a$, decreases. If the dynamic resistances of the diodes $D_3$ and $D_4$ which shunt the emitter of $Q_1$ increase, the gain decreases. Correspondingly, if the dynamic resistances of $D_3$ and $D_4$ decrease, the gain increases.

In that the currents through transistors $Q_3$ and $Q_4$ are equal and move equal amounts but opposite in direction, the dynamic resistances of the diodes $D_1$ through $D_4$ and $D_5$ through $D_8$ vary either to increase or decrease the gains of the associated transistors $Q_1$ and $Q_2$ respectively.

For example, if the current through $Q_3$ increases, the dynamic resistance of diodes $D_1$ and $D_2$ decrease. At the same time, the current through $Q_4$ decreases, thus increasing the dynamic resistance of diodes $D_3$ and $D_4$. At this point, the gain, $G_a$, of $Q_1$ will decrease. The diodes associated with transistor $Q_2$ will be controlled in an inverse manner and therefore the gain, $G_b$, of $Q_2$ will increase.

This is so because the current source $Q_3$ drives the collector coupled diodes of $Q_1$ ($D_1$ and $D_2$) and also the emitter coupled diodes of $Q_2$ ($D_5$ and $D_6$). Transistor $Q_4$ drives the emitter coupled diodes of $Q_1$ ($D_3$ and $D_4$) and also the collector coupled diodes of $Q_2$ ($D_7$ and $D_8$).

The cross coupling of the diodes ensures that as the gain of one amplifier increases by a given amount, the gain of the other amplifier decreases by the same amount correspondingly.

The cross coupled diodes $D_1$ through $D_8$ ensure proper and equal gain changes through varying the gain $G_a$ and $G_b$ of the amplifiers by varying the effective collector and emitter dynamic resistances. This action also ensures that the gain is a logarithmic function of the control voltage. In that the diodes are driven from constant current sources, $Q_3$ and $Q_4$, they are very temperature stable also.

Figure 3:
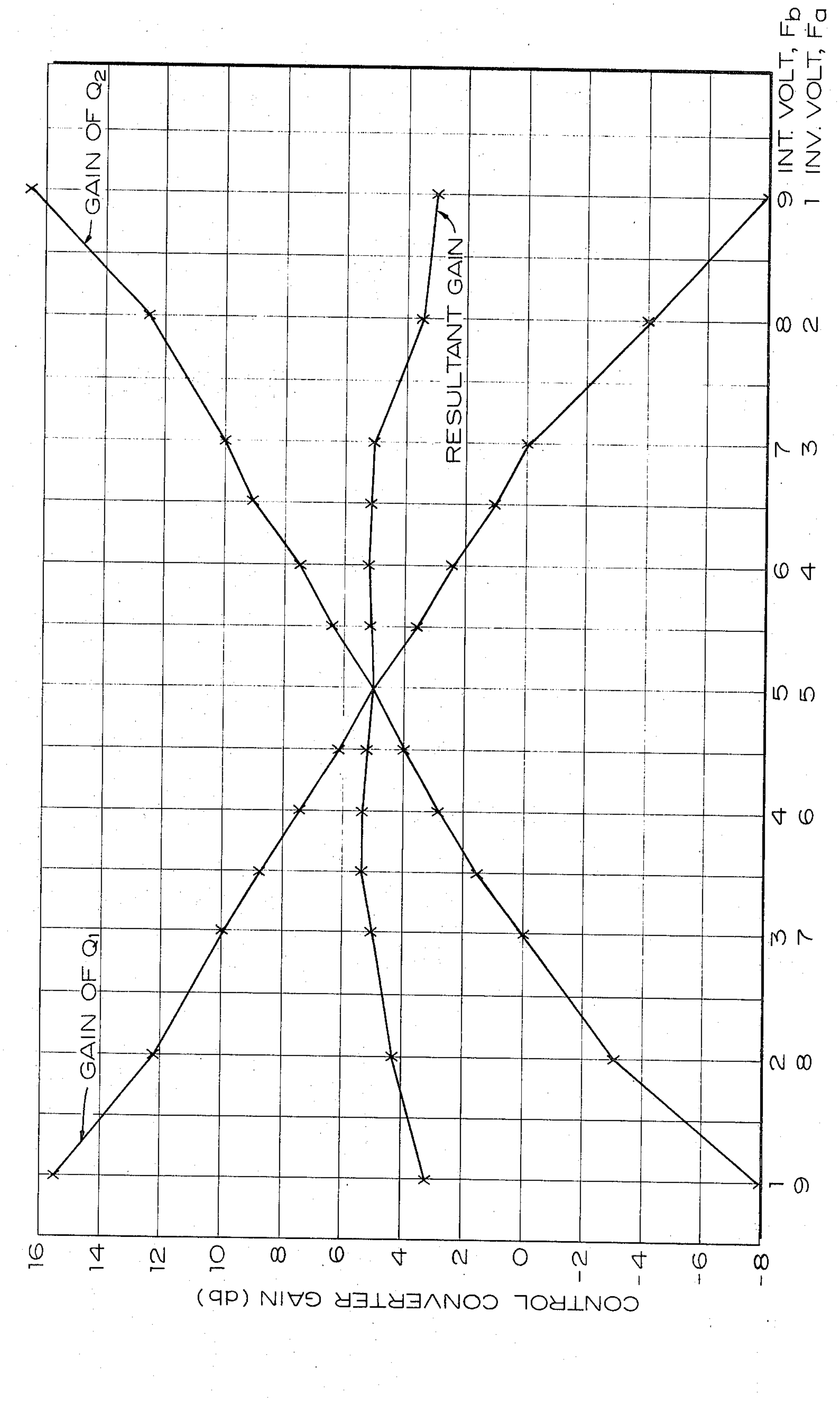
FIG. 3 is a graph illustrating the control converter gain versus control voltages.

FIG. 3 illustrates graphically, the measured results for the circuit of FIG. 2. As can be seen, the resultant gain of the control converters is nearly linear, as desired.

What is claimed is:

1. In a servo loop the improvement comprising:

at least two variable gain amplifiers, each having at least one amplifying component, input circuit coupled to a first terminal of one of said at least one amplifying component, and output circuit, wherein said one of at least one amplifying component of each amplifier is a transistor and said first terminal is the base; and dynamic resistance means operatively connected to each of said at least two variable gain amplifiers for varying the gain thereof, including a first circuit coupled to a second terminal of said one of said at least one amplifying component of a first said amplifier, a second circuit coupled to a third terminal of said one of said at least one amplifying component of said first amplifier, a third circuit coupled to a second terminal of said one of said at least one amplifying component of a second said amplifier, and a fourth circuit coupled to a third terminal of said one of said at least one amplifying component of said second amplifier, wherein each said circuit includes a plurality of diodes and said first circuit is coupled to the collector and said second circuit is coupled to the emitter of said transistor of said first amplifier, said third circuit is coupled to the collector and said fourth circuit is coupled to the emitter of said transistor of said second amplifier, and the collector and the emitter of each is coupled to the junction of two of said diodes of each said circuit.

2. The improvement of claim 1 wherein;

said first and said fourth, and said second and said third circuits are connected in parallel such that they operate in unison to simultaneously alter the dynamic resistances of the amplifiers to increase the gain of one and decrease the gain of another.

* * * * *